(12) United States Patent
Lo

(10) Patent No.: US 10,113,632 B2
(45) Date of Patent: Oct. 30, 2018

(54) BICYCLE SPROCKET WHEEL UNIT AND MOUNTING UNIT FOR COOPERATING WITH SPROCKET WHEELS

(71) Applicant: Shih-Ming Lo, Changhua (TW)

(72) Inventor: Shih-Ming Lo, Changhua (TW)

(*) Notice: Subject to any disclaimer, the term of this patent is extended or adjusted under 35 U.S.C. 154(b) by 222 days.

(21) Appl. No.: 15/230,361

(22) Filed: Aug. 5, 2016

(65) Prior Publication Data

US 2017/0370461 A1 Dec. 28, 2017

(30) Foreign Application Priority Data

Jun. 23, 2016 (TW) ............................. 105209480 U

(51) Int. Cl.
*F16H 55/30* (2006.01)
*B62M 9/10* (2006.01)
*F16H 55/12* (2006.01)

(52) U.S. Cl.
CPC ............... *F16H 55/30* (2013.01); *B62M 9/10* (2013.01); *F16H 55/12* (2013.01)

(58) Field of Classification Search
CPC ............ F16H 55/30; F16H 55/12; B62M 9/10
USPC .................................................. 474/152, 162
See application file for complete search history.

(56) References Cited

U.S. PATENT DOCUMENTS

| 3,439,551 | A | * | 4/1969 | Militana | F16H 55/12 474/162 |
| 4,043,214 | A | * | 8/1977 | Westlake | F16H 55/12 474/162 |
| 4,111,064 | A | * | 9/1978 | Purcell | F16H 55/12 474/162 |
| 4,384,865 | A | * | 5/1983 | Ueno | B62M 9/10 474/160 |
| 4,711,635 | A | * | 12/1987 | Arnce | B62J 31/00 474/152 |
| 5,026,329 | A | * | 6/1991 | Diekevers | B62D 55/0963 474/162 |
| 5,194,051 | A |   | 3/1993 | Nagano |  |
| 5,702,316 | A | * | 12/1997 | Cole | F16H 55/12 474/95 |
| 6,074,316 | A | * | 6/2000 | Murrietta, Sr. | F16H 55/12 474/95 |
| 8,267,818 | B2 | * | 9/2012 | Curley | F16H 55/12 474/152 |

(Continued)

*Primary Examiner* — Henry Y Liu
*Assistant Examiner* — Robert T Reese
(74) *Attorney, Agent, or Firm* — Pai Patent & Trademark Law Firm; Chao-Chang David Pai

(57) ABSTRACT

A bicycle sprocket wheel unit includes multiple section units connected to each other. Each section unit has teeth formed on the outer periphery thereof. Each section unit has at least one fixing device that is connected to a mounting unit. The mounting unit is made by way of pressing to form an integral ring plate which includes a hub connection hole defined in the center thereof. A first disk, a second disk and a third disk are connected to the mounting unit and share the center of the hub connection hole. A first sprocket wheel and a second sprocket wheel are respectively located on two sides of the third disk. The second disk is connected to a third sprocket wheel and a fourth sprocket wheel. The third disk is riveted to the first and second sprocket wheels along the whole face thereof to reinforce lateral strength of the sprocket wheels.

3 Claims, 7 Drawing Sheets

(56) References Cited

U.S. PATENT DOCUMENTS

| | | | | |
|---|---|---|---|---|
| 9,033,835 B2* | 5/2015 | Blank | ...................... | B62M 9/10 |
| | | | | 474/152 |
| 9,518,645 B2* | 12/2016 | McCombs | ............. | B21D 22/14 |
| 2012/0196711 A1 | 8/2012 | Loy et al. | | |
| 2015/0122066 A1* | 5/2015 | McCombs | ............. | B21D 22/14 |
| | | | | 74/433.5 |

* cited by examiner

BICYCLE SPROCKET WHEEL UNIT AND MOUNTING UNIT FOR COOPERATING WITH SPROCKET WHEELS

BACKGROUND OF THE INVENTION

1. Field of the Invention

The present invention relates to a bicycle sprocket wheel unit and a mounting unit to which the sprocket wheels are mounted, and more particularly to a sprocket wheel unit used for front wheel and rear wheel.

2. Descriptions of Related Art

The conventional sprocket wheels used on bicycle front wheel and the sprocket wheel unit used on bicycle rear wheel generally are made of a mediate to low carbon steel plate which is about 1.75 to 3.2 mm thick and made by the steps of pressing, teeth formation, heat treatment, grinding, electro-coating and surface treatment. Some sprocket wheels having a complicated structure require an expensive method such as forging or CNC machining. It is noted that sprocket wheels with larger radius and more teeth usually have higher manufacturing standard. The quality of the sprocket wheels may not meet the expected standard due to improper treatment in any one of the steps.

US 2012/0196711 discloses a sprocket wheel used on rear wheel in the form of an integral ring plate. The sprocket wheels numbered 11, 12, 13 are categorized as big sprocket wheels, and the sprocket wheels numbered 14, 15, 16 are categorized as small sprocket wheels. It is more difficult to manufacture the big sprocket wheels than the small sprocket wheels. These sprocket wheels are connected to the mounting unit at even space and fixed to the rear hub. Spacers are placed between the sprocket wheels.

U.S. Pat. No. 5,194,051A discloses a mounting unit which has multiple arms extending radially therefrom and each arm has stepped faces so as to fix multiple sprocket wheels to the stepped faces. The mounting unit is made by way of forging and has higher manufacturing cost and requires a longer manufacturing time.

The present invention is intended to provide a bicycle sprocket wheel unit and a mounting unit therefor to eliminate the shortcomings mentioned above.

The sprocket wheel unit can be used for both the front wheel and the rear wheel. The mounting unit is used for the sprocket wheels used on both of the front wheel and the rear wheel.

SUMMARY OF THE INVENTION

The bicycle sprocket wheel unit according to the present invention comprises multiple section units connected to each other. Each section unit has teeth formed on the outer periphery thereof. Each section unit has at least one fixing device that is connected to a mounting unit.

The mounting unit is made by way of pressing to form an integral ring plate that includes a hub connection hole defined in the center thereof. A first disk, a second disk and a third disk are connected to the mounting unit and share the center of the hub connection hole. The outer periphery of the second disk is connected to the inner periphery of the third disk. The inner periphery of the second disk is connected to the outer periphery of the first disk. The length of the inner periphery of the second disk is shorter than that of the outer periphery of the second disk. The second disk is a cone-shaped face and protrudes from the front face of the mounting unit. A first fixing portion is formed on the front face of the third disk, and a second fixing portion is formed on the rear face of the third disk. The third disk has multiple fixing apertures defined therethrough which are evenly spaced apart from each other. The second disk has multiple third fixing portions formed close to the outer periphery thereof. The second disk has multiple fourth fixing portions formed close to the inner periphery thereof. The first and second fixing portions are used to fix the sprocket wheels of the present invention. The third and fourth fixing portions are used to fix the sprocket wheels of the present invention or the conventional sprocket wheels.

The advantages of the present invention are that the ring-shaped sprocket wheel is composed of multiple section units. The manufacturing and machining for the section units are easier than those applied on the conventional sprocket wheels.

The connection of the section units is easy and secure.

The individual section units can be replaced without discarding the whole sprocket wheel.

The section units are connected to each other by the fixing device, and the sprocket wheel can be easily fixed to the mounting unit.

The mounting unit is connected to four sprocket wheels, and no spacer is needed between the sprocket wheels.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
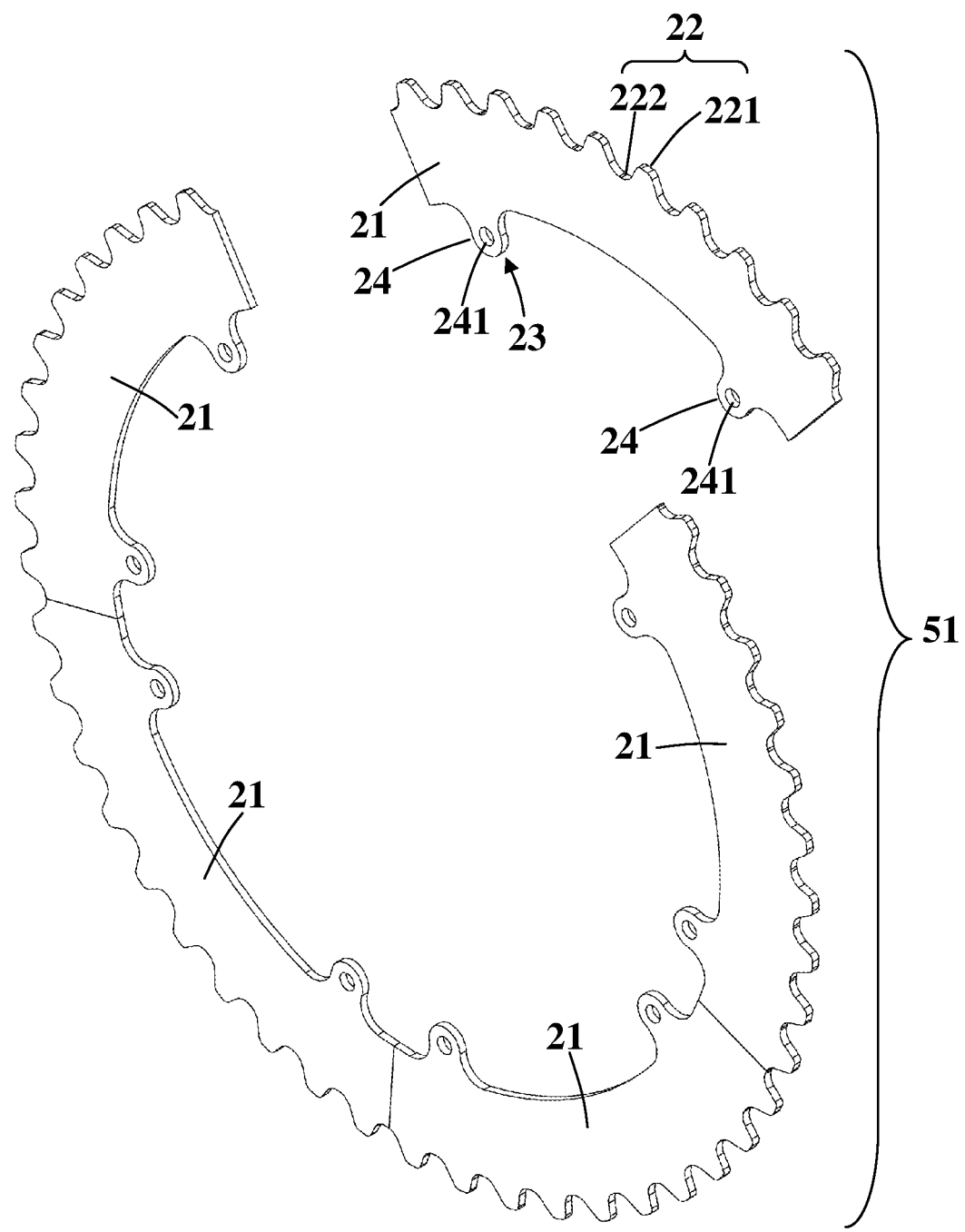
FIG. 1 shows the first sprocket wheel of the present invention.
Figure 2:
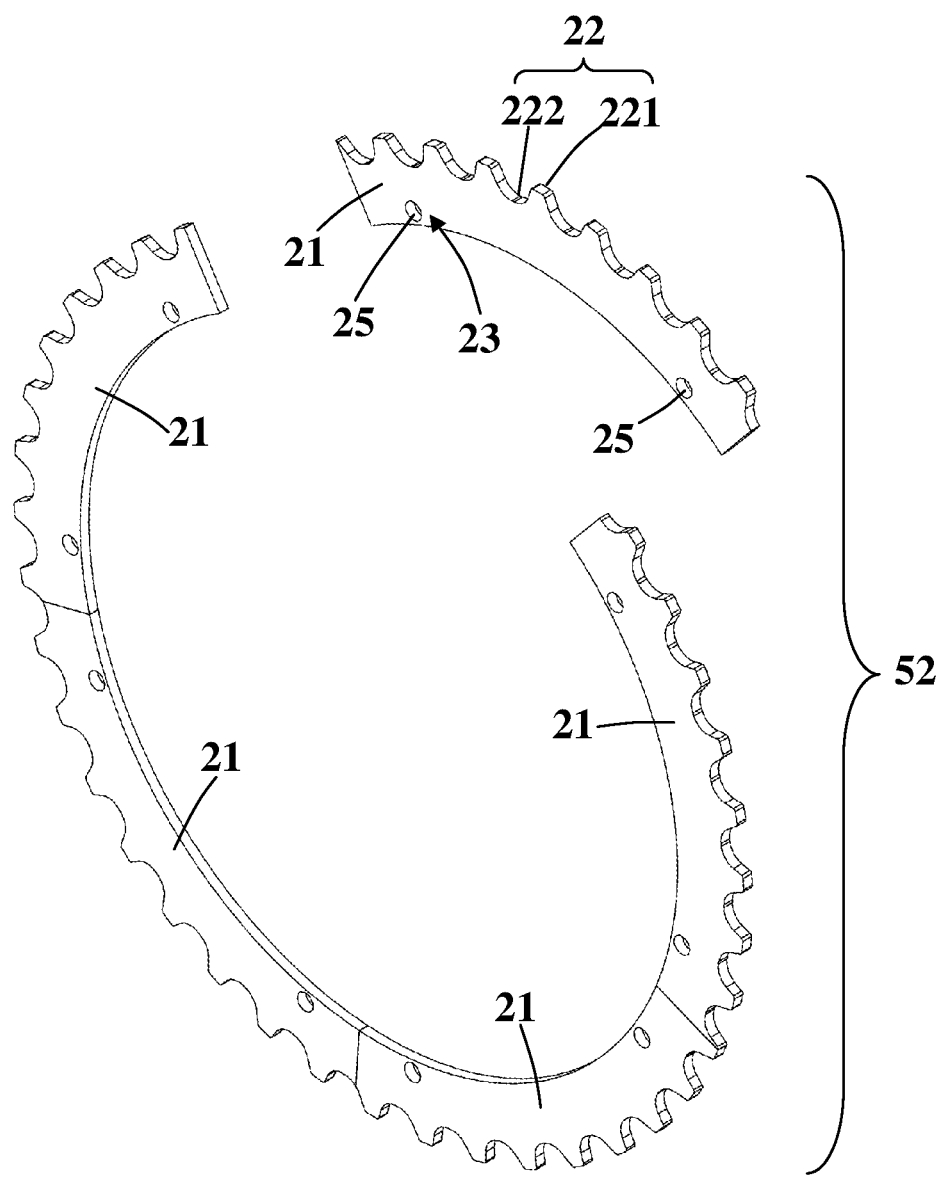
FIG. 2 shows the second sprocket wheel of the present invention.
Figure 3:
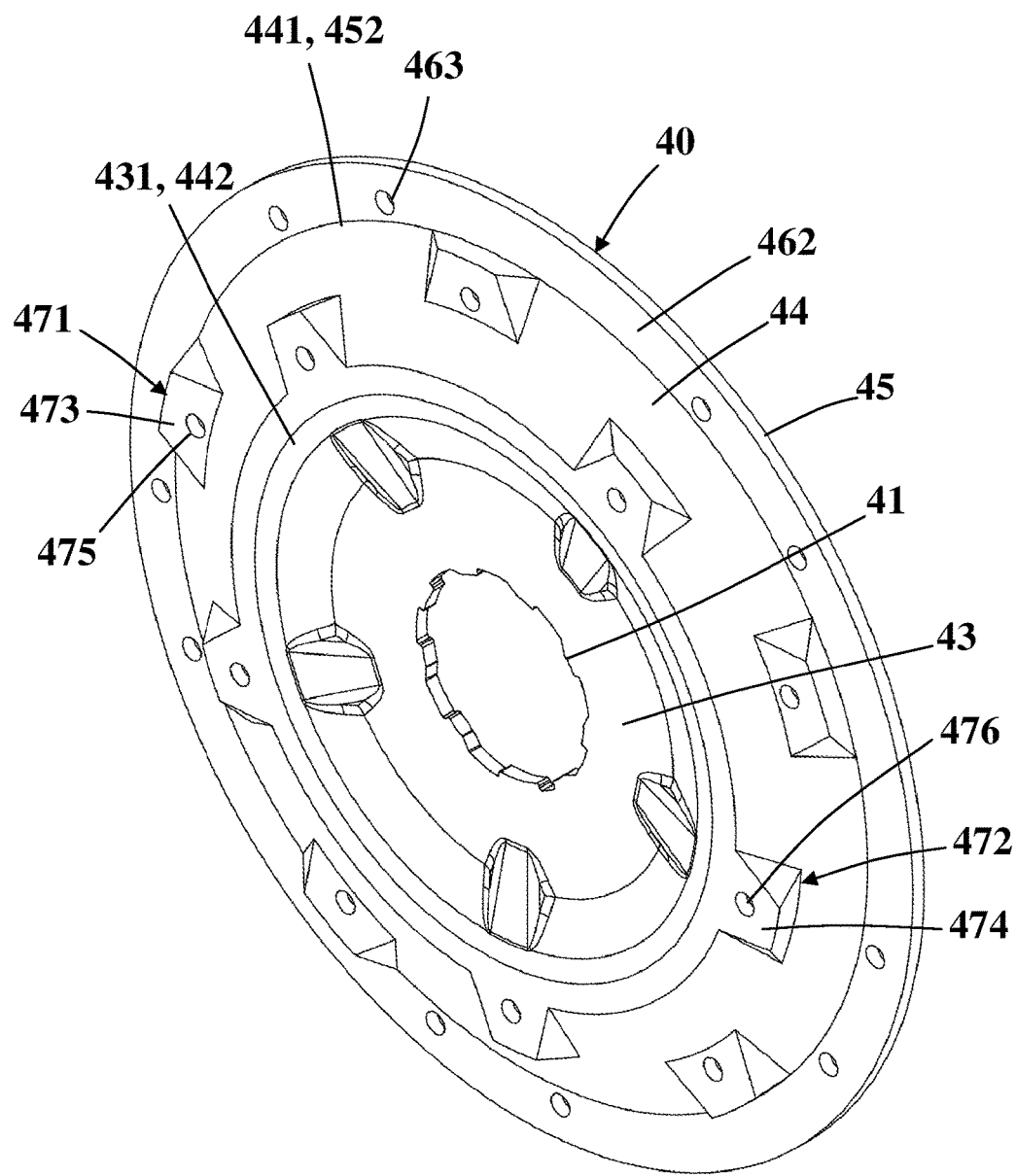
FIG. 3 shows the mounting unit of the present invention.
Figure 4:
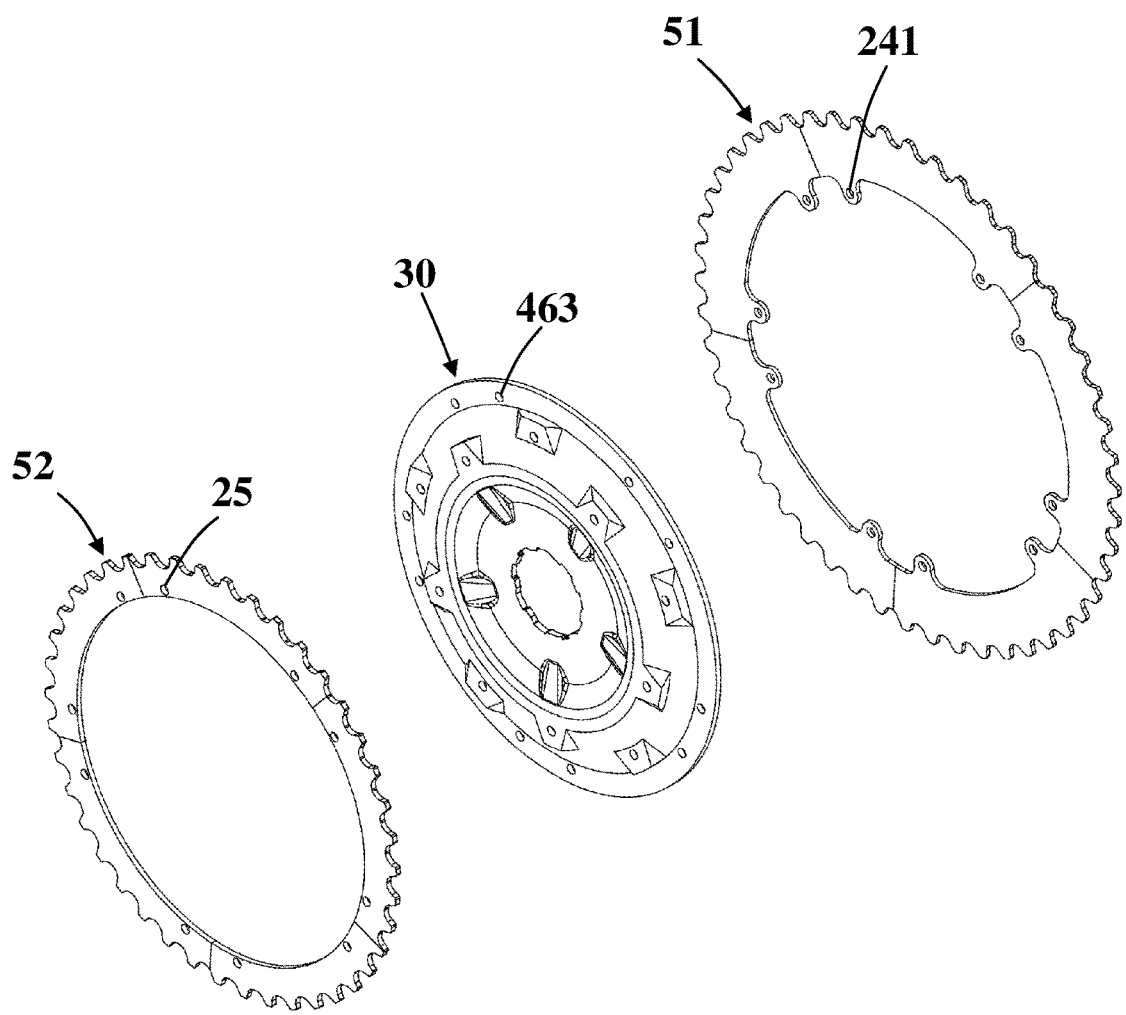
FIG. 4 is an exploded view of the first and second sprocket wheels and the mounting unit of the present invention.
Figure 5:
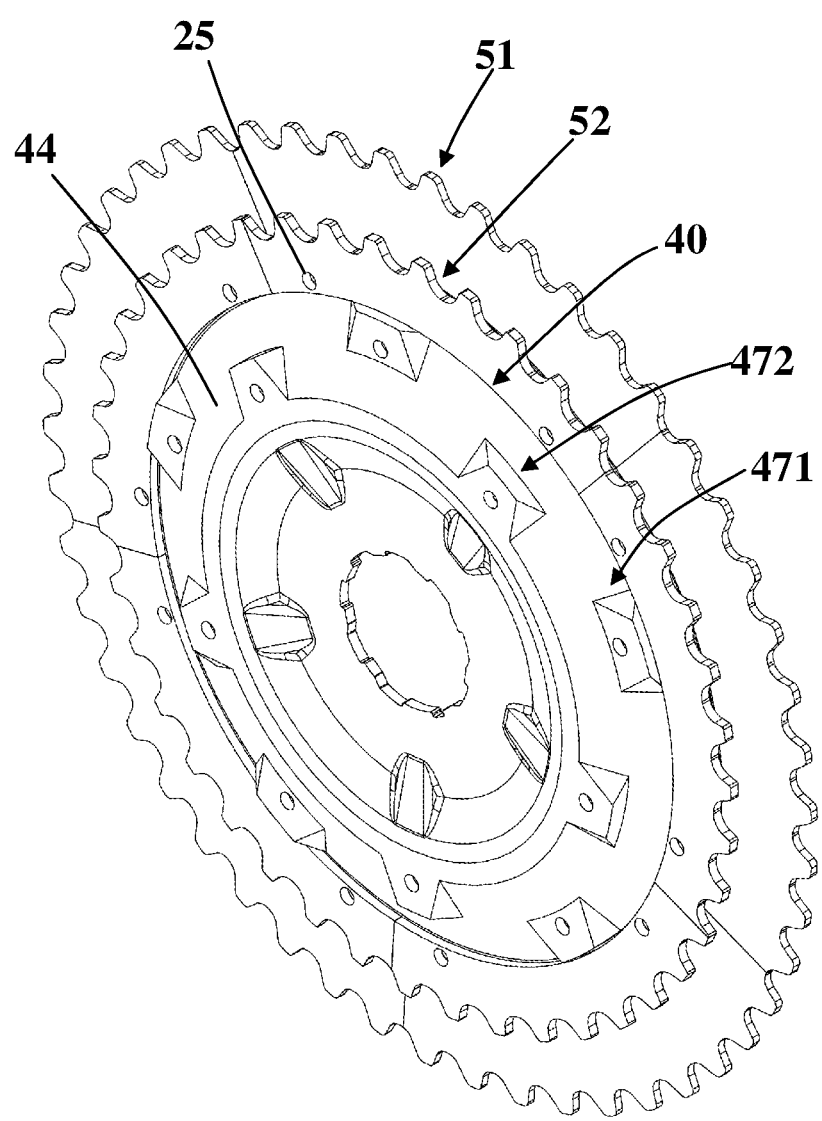
FIG. 5 is a perspective view of the combination of the first and second sprocket wheels and the mounting unit of the present invention.
Figure 6:
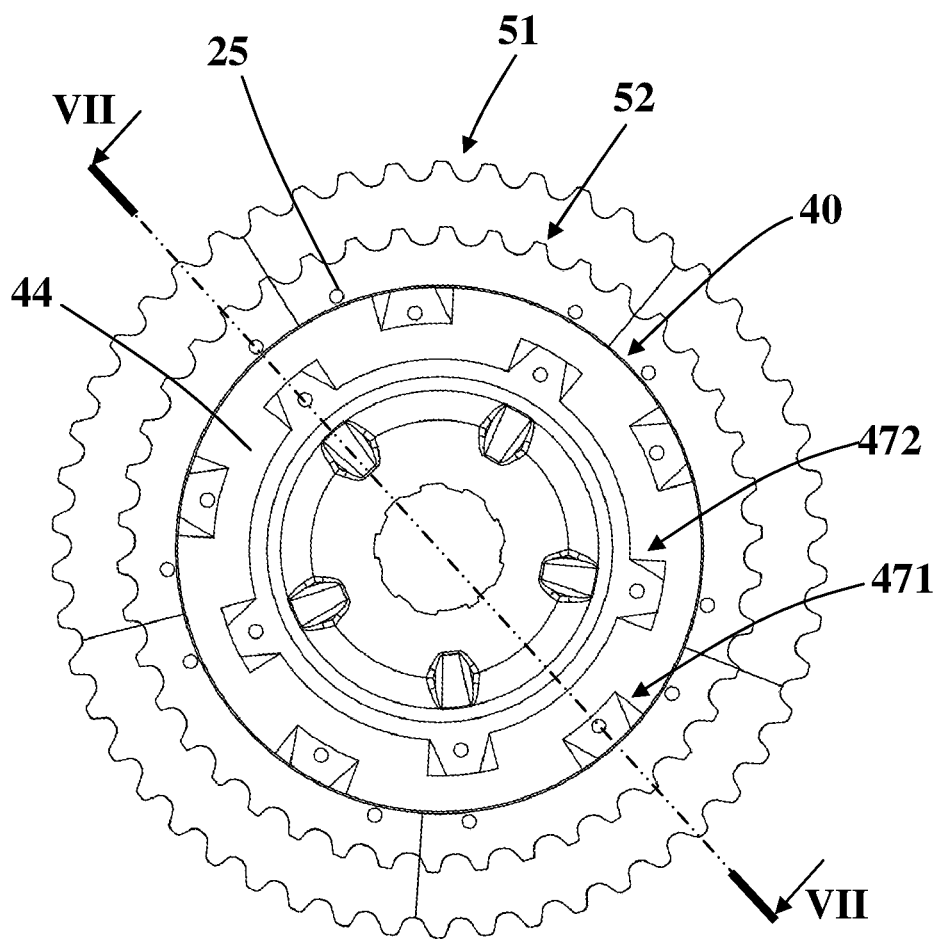
FIG. 6 is a front view of the combination shown in FIG. 5.

Referring to FIGS. 1 and 2, the first sprocket wheel 51 and the second sprocket wheel 52 of the present invention each comprise a plurality of section units 21 connected to each other seamlessly. Each section unit 21 has a pre-set number of teeth 22 formed on the outer periphery thereof. Each section unit 21 has at least one fixing device 23 which is connected to a mounting unit 40 as shown in FIG. 3. In one embodiment, there are two fixing devices 23 for each section unit 21. There are 2-8 section units 21 for each sprocket wheel 51, 52. Preferably, there are 6 section units 21 for each sprocket wheel 51, 52.

As shown in FIG. 1, each of the fixing devices 23 includes two lugs 24 protruding from the inner periphery of the section unit 21 corresponding thereto. A fixing hole 241 is defined in each of the lugs 24. As shown in FIG. 2, the fixing device 23 of the second sprocket wheel 52 has two fixing holes 25 defined through the section unit 21. The two respective connected ends of any two of the adjacent section units 21 together form a valley 222 between two of the teeth 22. Alternatively, the two respective connected ends of any two of the adjacent section units 21 together form a peak 221 of one of the teeth 22. Preferably, a valley 222 is formed by the two respective ends of any two of the adjacent section units 21.

As shown in FIG. 3, the mounting unit 40 is made by way of pressing to form an integral ring-shaped plate which includes a hub connection hole 41 defined in the center thereof. The mounting unit 40 comprises a first disk 43, a second disk 44 and a third disk 45 formed thereto and sharing a center of the hub connection hole 41. The outer periphery 441 of the second disk 44 is connected to the inner periphery 452 of the third disk 45. The inner periphery 442 of the second disk 44 is connected to the outer periphery 431 of the first disk 43. The length of the inner periphery 442 of the second disk 44 is shorter than that of the outer periphery 441 of the second disk 44. The second disk 44 is a cone-shaped face and protrudes from the front face of the mounting unit 40. A first fixing portion 461 is formed on the front face of the third disk 45, and a second fixing portion 462 is formed on the rear face of the third disk 45. The third disk 45 has multiple fixing apertures 463 defined therethrough which are evenly spaced apart from each other. The second disk 44 has multiple third fixing portions 471 formed on the outer periphery 441 thereof. The second disk 44 has multiple fourth fixing portions 472 formed on the inner periphery 442 thereof. Each of the third and fourth fixing portions 471, 472 has a fixing face 473/474 protruding from the second disk 44. The fixing faces 473 of the third fixing portions 471 and the fixing faces 474 of the fourth fixing portions 472 are parallel to the second fixing portion 462 of the third disk 45. The fixing faces 473 of the third fixing portions 471 each have a fixing hole 475, and the fixing faces 474 of the fourth fixing portions 472 each have a fixing hole 476. The fourth fixing portions 472 are located alternately between the third fixing portions 471.

As shown in FIGS. 4 to 7, multiple rivets (not shown) extend through the fixing apertures 463 of the mounting unit 40, the fixing holes 241 of the first sprocket wheel 51, the fixing holes 25 of the second sprocket wheel 52 so as to secure the first sprocket wheel 51 to the first fixing portion 461 and to secure the second sprocket wheel 52 to the second fixing portion 462 of the third disk 45. The thickness of the third disk 45 of the mounting unit 40 provides a proper distance between the first sprocket wheel 51 and the second sprocket wheel 52.

Figure 7:
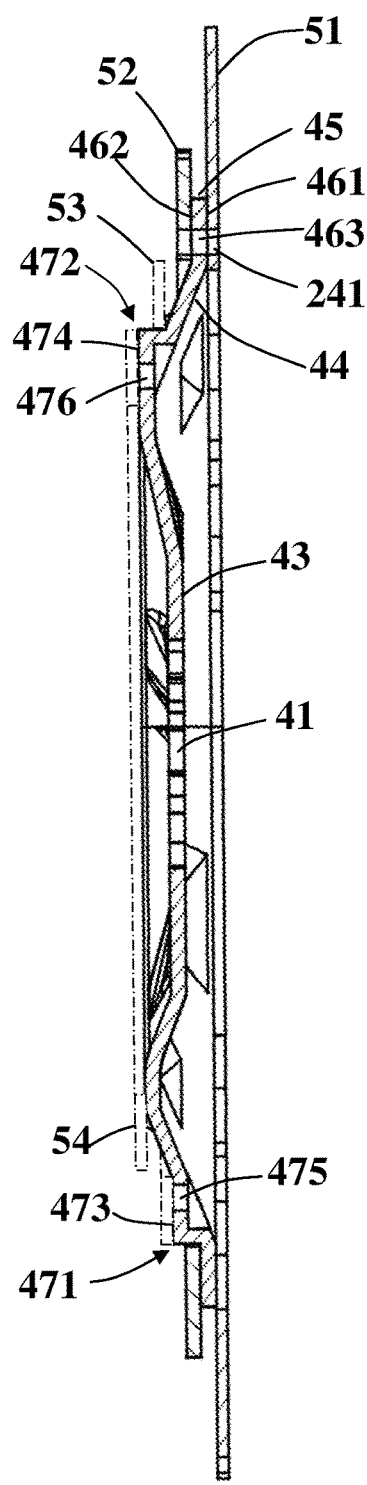
FIG. 7 is a cross sectional view to show the sprocket wheels connected to the mounting unit of the present invention.

As shown in FIG. 7, a third sprocket wheel 53 is fixed to the third fixing portions 471 by rivets (not shown). A fourth sprocket wheel 54 is fixed to the fourth fixing portions 472 by rivets (not shown). Therefore, the third sprocket wheel 53 and the fourth sprocket wheel 54 having different number of teeth are fixed to the second disk 44 of the mounting unit 40. The third sprocket wheel 53 and the fourth sprocket wheel 54 can be the sprocket wheels of the present invention composed of multiple section units 21. Alternatively, the third and fourth sprocket wheels 53, 54 can be the conventional integral ring-shaped sprocket wheels. Because the second disk 44 is a cone-shaped face so that there is a height difference between the third fixing portions 471 and the fourth fixing portions 472, so that a distance is formed between the third sprocket wheel 53 and the fourth sprocket wheel 54. The distance between the first sprocket wheel 51 and the fourth sprocket wheel 54 meets the requirements of the existed regulations.

The sprocket wheels 51, 52 can be used on both the front wheel and the rear wheel.

While we have shown and described the embodiment in accordance with the present invention, it should be clear to those skilled in the art that further embodiments may be made without departing from the scope of the present invention.

What is claimed is:

1. A mounting unit comprising:
an integral ring-shaped plate which is made by way of pressing, the mounting unit including a hub connection hole defined in a center thereof, and comprising a first disk, a second disk and a third disk, the first, second and third disks sharing a center of the hub connection hole, an outer periphery of the second disk connected to the inner periphery of the third disk, an inner periphery of the second disk connected to the outer periphery of the first disk, the inner periphery of the second disk being shorter than the outer periphery of the second disk, the second disk being a cone-shaped face and protruding from a front face of the mounting unit, a first fixing portion formed on a front face of the third disk, a second fixing portion formed on a rear face of the third disk, the third disk having multiple fixing apertures defined therethrough which are evenly spaced apart from each other, the second disk having multiple third fixing portions formed on the outer periphery thereof, and the second disk having multiple fourth fixing portions formed on the inner periphery thereof.

2. The mounting unit as claimed in claim 1, wherein each of the third and fourth fixing portions has a protruding fixing face, the fixing faces of the third fixing portions and the fourth fixing portions are parallel to the second fixing portion of the third disk, the fixing faces of the third fixing portions and the fourth fixing portions each have a fixing hole.

3. The mounting unit as claimed in claim 2, wherein the fourth fixing portions are located alternately between the third positioning portions.

* * * * *